United States Patent
Kakuta et al.

(10) Patent No.: US 6,814,353 B1
(45) Date of Patent: Nov. 9, 2004

(54) AUTOMATIC DOCUMENT FEEDER AND IMAGE FORMING DEVICE

(75) Inventors: Masayuki Kakuta, Osaka (JP); Hiroyuki Harada, Osaka (JP); Takuya Eto, Osaka (JP)

(73) Assignee: Kyocera Mita Corporation, Osaka (JP)

(*) Notice: Subject to any disclaimer, the term of this patent is extended or adjusted under 35 U.S.C. 154(b) by 0 days.

(21) Appl. No.: 10/249,617

(22) Filed: Apr. 24, 2003

(51) Int. Cl.[7] .............................................. B65H 29/00
(52) U.S. Cl. .................... 271/186; 271/65; 271/301; 271/291
(58) Field of Search .................... 271/186, 65, 301, 271/291

(56) References Cited

U.S. PATENT DOCUMENTS

| | | | | |
|---|---|---|---|---|
| 4,714,241 A | * | 12/1987 | Randall ..................... | 271/3.03 |
| 4,979,727 A | * | 12/1990 | Koike et al. ............... | 271/3.03 |
| 5,887,865 A | * | 3/1999 | Ishimaru .................... | 271/4.1 |
| 6,161,831 A | * | 12/2000 | Kusakabe et al. .......... | 271/186 |
| 6,513,805 B2 | * | 2/2003 | Takida et al. .............. | 271/291 |
| 6,648,320 B2 | * | 11/2003 | Iino et al. .................. | 271/3.15 |

FOREIGN PATENT DOCUMENTS

| | | |
|---|---|---|
| JP | H07-175279 A | 7/1995 |
| JP | H09-106116 A | 4/1997 |

* cited by examiner

Primary Examiner—Donald P. Walsh
Assistant Examiner—Kaitlin Joerger
(74) Attorney, Agent, or Firm—Shinjyu Global IP

(57) ABSTRACT

An automatic document feeder comprising a reversing device and a discharge device is disclosed. The reversing device and the discharge device are disposed such that the distance in the horizontal direction from an original document reading position in the automatic document feeder to the discharge device is longer than the distance in the horizontal direction from the original document reading position to the reversing device. This configuration allows the use of original documents whose length in the transport direction is short, and also shortens the transport path in the automatic document feeder as well as the amount of time needed to read an original document. Furthermore, this configuration increases the visibility of original documents discharged to the discharge tray by the discharge device because the discharge device is disposed relatively far away from the original document reading position.

7 Claims, 7 Drawing Sheets

AUTOMATIC DOCUMENT FEEDER AND IMAGE FORMING DEVICE

BACKGROUND OF INVENTION

1. Field of the Invention

The present invention relates to an automatic document feeder employed in copying machines, printers, facsimile machines, and the like that automatically transports original documents, and also relates to an image forming device comprising the same.

2. Background Information

Automatic document feeders employed in image forming devices such as copying machines, printers, and the like which automatically read image data and the like recorded on both sides of an original document are well known in the prior art.

This type of automatic document feeder is disclosed in Japanese Published Patent Applications H07-175279 and H09-106116. These devices are schematically illustrated in FIGS. 6 and 7.

The device shown in FIG. 6 is disposed along the path in which original documents D are transported (the path illustrated by the arrows a), and includes a loading tray 101, a pick-up roller 102, a paper supply roller 103, a pair of transport rollers 104, a transport drum 105, transport rollers 106, 107, and 108, a pair of discharge/reverse rollers 110, and a discharge tray 111. In addition, an original document reading position R is disposed between the transport rollers 107 and 108. Here, the upper surface of each original document D mounted in the loading tray 101 is the A side, and the lower surface thereof is the B side.

When only the A side of an original document D is to be read out, the original document D is supplied from the loading tray 101, the A side thereof is read, and is then discharged directly to the discharge tray 111 by the pair of discharge/reverse rollers 110. More specifically, a plurality of original documents D placed in the loading tray 101 are first supplied and transported one sheet at a time by the pick-up roller 102, the paper supply roller 103, and the pair of transport rollers 104. Next, while each original document D is transported by the transport drum 105 and the transport rollers 106, 107, and 108, the A side thereof is read at the original document reading position R. Then, after the A side of each original document D is read, they are transported in the direction illustrated by the arrow a by rotating the discharge/reverse rollers 110 in the directions shown, and are then discharged to the discharge tray 111 with the A side thereof facing downward.

In contrast, when both the A side and the B side of an original document D are to be read, after the A side thereof is read, the original document D is transported in the direction of the arrows a by rotating the discharge/reverse rollers 110 in the same direction as described above. However, when the trailing edge of the original document D reaches the discharge/reverse rollers 110, the discharge/reverse rollers 110 will reverse their rotations. Thus, each original document D is transported in the direction illustrated by the arrow b, transported to the original document reading position R by means of the transport drum 105 and the transport rollers 106, 107, and 108 such that the B side of each is facing away from the transport drum 105, and the B side of each is then read. After the B side of each original document D is read, each is transported around the transport drum 105, and is discharged to the discharge tray 111. More specifically, after the B side of the original document D is read, it is transported in the direction illustrated by the arrows a by rotating the discharge/reverse rollers 110 in the directions shown, and when the trailing edge of each reaches the discharge/reverse rollers 110, each is transported in the direction illustrated by the arrow b by reversing the rotation of the discharge/reverse rollers 110. Then, each original document D will transported by the transport drum 105 and the transport rollers 106, 107, and 108 and discharged to the discharge tray 111 without being read. When this occurs, each original document D will be discharged with the A side of each facing downward.

FIG. 7 will now be described.

The device shown in FIG. 7 eliminates the structure used to reverse the orientation of the A and B sides of an original document D. Because the device shown in FIG. 7 has the same basic structure as the automatic document feeder shown in FIG. 6, only the differences between it and the device of FIG. 6 will be described below.

This automatic document feeder is comprised of a drive roller 112, driven rollers 113, 114, a switching claw 115, a pair of reverse rollers 116, and an intermediate tray 117. Note that in this device, the drive roller 112 and the driven roller 113 below it form a pair of discharge rollers.

In this device, the switching claw 115 is placed in the position indicated by the dotted lines when only the A side of an original document D is to be read, and after the A side thereof is read, the original document D is discharged to the discharge tray 111 by rotating the drive roller 112 in the direction indicated by the arrow.

In contrast, when both the A side and the B side of an original document D are to be read, after the A side thereof is read, the switching claw 115 is placed in the position indicated by the solid lines, and the original document D is guided to the intermediate tray 117 by rotating the drive roller 112 and the pair of reverse rollers 116 in the directions indicated by the respective arrows.

When the trailing edge of the original document D reaches the reverse rollers 116, the reverse rollers 116 reverse rotation, transport the original document D in the direction illustrated by the arrow b, and the B side thereof is then read at the original document reading position R. After the B side of the original document D is read, the orientation of the A and B sides is reversed and the original document D is discharged to the discharge tray 111. More specifically, after the B side of an original document D is read, the switching claw 115 will be placed in the position indicated by the solid lines, and will be guided to the intermediate tray 117 by rotating the drive roller 112 and the reverse rollers 116 in the direction indicated by the respective arrows. Then, when the trailing edge of the original document D reaches the reverse rollers 116, the reverse rollers 116 will reverse rotation, and will then transport the original document D in the direction indicated by the arrow b. The original document D is not read at this point. The switching claw 115 is placed in the position shown by the dotted line, and by rotating the drive roller 112 in the direction indicated by the arrow, the original document D is discharged to the discharge tray 111 with the A side thereof facing upward.

As noted above, in an automatic document feeder that can automatically read both sides (the A side and B side) of an original document D, it is preferable that the pair of reverse rollers be disposed a relatively short distance away from the original document reading position R, and that the pair of discharge rollers be disposed a relatively long distance way from the original document reading position R.

The reason for the former is that when the pair of reverse rollers is relatively far away from the original document reading position R, the pair of reverse rollers will also be relatively far away from the adjacent transport members (the transport rollers 106 or 108 in the example of FIG. 6), and thus an original document that is not large enough to extend between the pair of reverse rollers and an adjacent transport member cannot be transported thereby. In addition, in this situation, the original document transport path will be long, and thus the time needed to read the original document (especially the time needed to read the B side and then switch the orientation of the A and B sides) will increase. Note that in situations in which the distance between the reverse rollers and the adjacent transport members is relatively long, a small original document (one whose length in the transport direction is short) can be handled if a separate transport member is added in between the reverse rollers and the adjacent transport members. However, this will complicate the automatic document feeder.

The reason for the latter is that when the pair of reverse rollers is relatively close to the original document reading position R, an original document D is discharged to a position further inside the device (the left side in FIGS. 6 and 7), and thus an original document D discharged to the discharge tray 111 cannot be easily seen due to the presence of the loading tray 101 or the intermediate tray 117. Note that, in general, a person using the device can confirm that an original document D has been discharged to the discharge tray 111 by looking diagonally into the space between the loading tray 101 and the discharge tray 111.

Thus, regardless of whether it is preferable to have the reverse rollers relatively close to the original document reading position R, or whether it is preferable to have the discharge rollers relatively far away from the original document reading position R, neither of these structures can be achieved with the device shown in FIG. 6 because the device shown therein includes discharge/reverse rollers 110 which function as both reverse rollers and discharge rollers. More specifically, when the discharge/reverse rollers 110 are positioned relatively close to the original document reading position R, the original document discharge position will shift further toward the interior of the device than the loading tray 101 (the left side in FIG. 6), and an original document D that has been discharged to the discharge tray 111 will be less visible to a person operating the device. On the other hand, when the discharge/reverse rollers 110 are positioned relatively far away from the original document reading position R, an original document D discharged to the discharge tray 111 is easier to see, but the original document reading position R will be relatively far away from the discharge/reverse rollers 110, and thus the time needed to read an original document will increase.

In the automatic document feeder shown in FIG. 7, the reverse rollers 116 are disposed relatively far away from the original document reading position R, and the discharge rollers (the drive roller 112 and the driven roller 113) are disposed relatively close to the original document reading position R. Thus, when both sides of an original document D are to be read, the time needed to read them will be longer, and it will be difficult to confirm that the original document D has been discharged to the discharge tray 111.

SUMMARY OF INVENTION

It is therefore an object of the present invention to separate the reverse rollers from the discharge rollers, and by optimally setting the positional relationship between the reverse rollers and the discharge rollers, make it possible to read original documents whose length in the transport direction is short, reduce the time needed to read both sides of an original document, and increase the visibility of original documents when they are discharged.

An automatic document feeder according to one aspect of the present invention is comprised of a loading unit, a supply device, a discharge device, a discharge unit, and a reversing device. Original documents are laded into the loading unit. The supply device supplies the original documents loaded in the loading unit to an original document reading position. The discharge device discharges the original documents which were read at the original document reading position. The discharge unit supports the original documents discharged by the discharge device. The reversing device is disposed below the loading unit and above the discharge device, and reverses the orientation each original document with respect to the original document reading position and then re-supplies them to the original document reading position. The reversing device and the discharge device are disposed such that the distance in the horizontal direction from the original document reading position to the discharge device is longer than the distance in the horizontal direction from the original document reading position to the reversing device.

According to another aspect of the present invention, the reversing device has an upper reverse roller and a lower reverse roller that form a reverse nip that grasps and transports an original document by mutually contacting the original document in a substantially vertical direction.

According to another aspect of the present invention, the discharge device has an upper discharge roller and a lower discharge roller that forms a discharge nip that grasps and transports an original document by mutually contacting the original document in a substantially vertical direction.

According to another aspect of the present invention, the reverse nip is disposed above the discharge nip.

According to another aspect of the present invention, the automatic document feeder further comprises a switching member. The switching member can be selectively placed in either the reverse position in order to guide an original document read at the original document reading position to the reverse nip unit, or the discharge position in order to guide an original document read at the original document reading position to the discharge nip.

According to another aspect of the present invention, an automatic document feeder further comprises an intermediate support member that supports a first end of an original document while a second end of the original document is in the grasp of the reverse nip.

In another aspect of the present invention, an image forming device comprises an original document reading device, an automatic document feeder, an image forming unit, and a recording media transport device. The original document reading device reads an original document in an original document reading position. The automatic document feeder is the device disclosed above that supplies the original document to the original document reading position, and transports the original document read at the original document reading position away therefrom. The image forming unit forms an image on the recording media based upon image data read by the original document reading device. The recording media transport device supplies recording media to the image forming unit, and transports the recording media on which an image has been formed away therefrom.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF DRAWINGS

Referring now to the attached drawings which form a part of this original disclosure.

DETAILED DESCRIPTION

Embodiments of the present invention will be described below with reference to the figures.

A. Automatic Document Feeder

Figure 1:
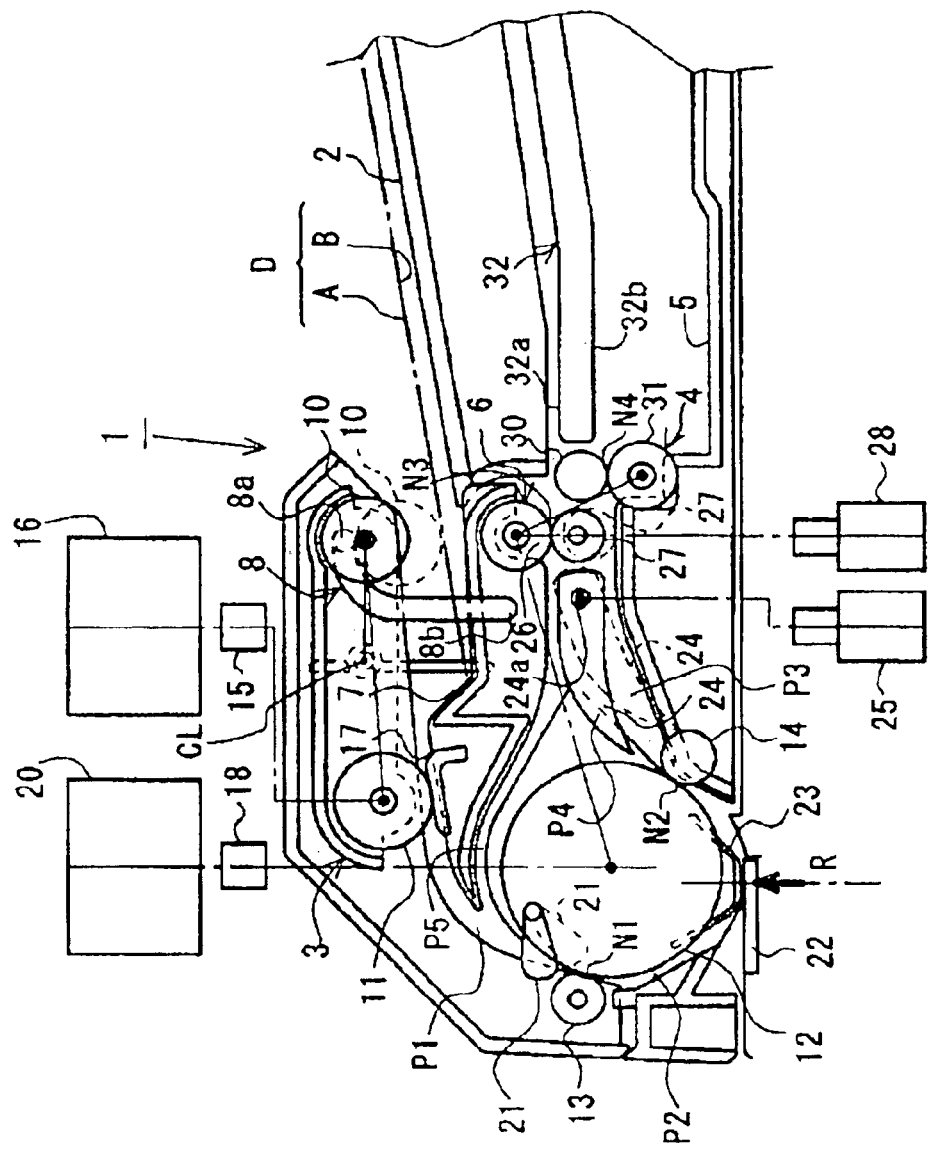
FIG. 1 is a longitudinal section of an automatic document feeder according to one embodiment of the present invention.

FIG. 1 shows a longitudinal section of the principal parts of an automatic document feeder 1 according to one embodiment of the present invention. Note that in the following description, the left side of the figure is the front of the device and the right side of the figure is the rear of the device.

The automatic document feeder 1 is comprised of a loading tray 2 that serves as a loading unit in which a plurality of original documents D can be loaded, a supply device 3 that supplies the original documents D loaded in the loading tray 2 to an original document reading position R, a discharge device 4 that discharges the original documents D after they have been read, a discharge tray 5 that serves as a discharge unit which supports the original documents D discharged from the discharge device 4, and a reversing device 6 that reverses the orientation of the original documents D with respect to the original document reading position after they are read and re-supplies them back to the original document reading position R.

The loading tray 2 is disposed in the upper portion of the automatic document feeder 1. The loading tray 2 is formed into an approximately planar shape, and is disposed such that it slopes gently downward toward the front of the device. A dividing wall 7 having an upwardly sloping surface is formed on the front end of the loading tray 2. The leading edges of the original documents D that are loaded onto the loading tray 2 come into contact with the dividing wall 7, and as noted below, the leading edge of each is dragged along and over the dividing wall 7 during document feeding. The original documents D loaded onto the loading tray 2 are loaded such that a first side (A or front side) is facing upward and a second side (B or rear side) is facing downward.

A set switch 8 that acts as a sensor to detect the presence or absence of an original document D is disposed near the front of the loading tray 2. The set switch 8 is an arm shaped member having a rotatable support shaft 8a and a leading edge 8b. The set switch 8 is supported above the loading tray 2 such that it can pivoted about the rotatable support shaft 8a by applying a comparatively small amount of force thereto. When one or more original documents D are loaded onto the loading tray 2, the leading edge 8b of the set switch 8 will be in a withdrawn position in which it lightly contacts the top of the original documents D. On the other hand, when there are no original documents D in the loading tray 2, the leading edge 8b will enter an aperture provided in the loading tray (not shown in the figures), and will take the position shown by the solid lines in FIG. 1. At this time, the leading edge 8b of the set switch 8 will detect that there are no original documents D present by, for example, interrupting the light path of a transparent optical sensor (not shown in the figures).

The supply device 3 includes a pick-up roller (forwarding roller) 10 that is disposed near the set switch 8, a supply roller 11 that is disposed in front of the pick-up roller 10 (the left side in FIG. 1), a large diameter transport drum 12 that is disposed in front of and below the supply roller 11, a pre-reading roller 13 that contacts with the transport drum 12 at approximately the front side thereof, and a post-reading roller 14 that contacts with the transport drum 12 at a lower rear portion thereof (the right side in FIG. 1).

The pick-up roller 10 is connected to a supply motor 16 via a supply clutch 15. When the pick-up roller 10 is rotatively driven in the clockwise direction by the supply motor 16 and the supply clutch 15, it pivots about a CL point and moves from the home position illustrated by the solid lines in FIG. 1 to a supply position illustrated by the dotted lines therein. More specifically, the pick-up roller 10 moves to a position that lightly contacts with the A side of the uppermost original document D loaded into the loading tray 2. In addition, when supply motor 16 rotates in the counterclockwise direction, the pick-up roller 10 will return to the home position. The supply motor 16 is a stepping motor capable of reciprocal rotation and which only rotates in a rotational angle (number of rotations) that is proportional to the number of pulses.

The supply roller 11, like the pick-up roller 10, is connected to the supply motor 16 via the supply clutch 15. The supply roller 11 contacts with the top of a divider pad 17. The supply roller 11 is rotatively driven in the clockwise direction by the supply motor 16 and the supply clutch 15, and feeds the original documents D that are transported from the pick-up roller 10 further downstream one sheet at a time. Note that even if a plurality of original documents D are transported from the pick-up roller 10, the divider pad 17 will prevent more than one original document D at a time from being fed downstream.

When the supply motor 16 rotates in the counterclockwise direction, the pick-up roller 10 and the supply roller 11 will rotate in the clockwise direction, and when the supply motor 16 rotates in the clockwise direction, the rotation thereof stops due to the operation of the supply clutch 15 (a one-way clutch).

The transport drum 12 is disposed Immediately above the original document reading position R, and is connected to a transport motor 20 via a transport clutch 18. The transport motor 20 is connected to the discharge device 4 and reversing device 6 (both described below) via the transport clutch 18. The transport motor 20 is, like the supply motor 16, a stepping motor that is capable of reciprocal rotation. A one way clutch (not shown in the figures) is Interposed between the transport drum 12 and the rotational shaft thereof, and the transport drum 12 will not rotate In the clockwise direction even if the transport motor 20 does rotate in the clockwise direction. More specifically, the transport drum 12 will rotate in the counterclockwise direction when the transport motor 20 rotates in the counterclockwise direction, but will be prevented from rotating in the clockwise direction when the transport motor 20 rotates in the clockwise direction.

The pre-reading roller 13 is in contact with the surface of the transport drum 12, and forms a first transport nip N1 between it and the transport drum 12. The pre-reading roller 13 is driven and rotated in the clockwise direction by the counterclockwise rotation of the transport drum 12, and thus an original document D is interposed between it and the transport drum 12 and is transported thereby.

A timing switch 21 is disposed immediately upstream (herein defined as the upstream side in the original document transport direction) from the pre-reading roller 13. When the timing switch 21 comes into contact with the leading edge of an original document D, it moves to a withdrawn position illustrated by the dotted lines in FIG. 1 and is maintained in this state until the original document D has completely passed over it. When the trailing edge of the original document D has passed over it, it returns to an operational position illustrated by the solid lines in FIG. 1. When the timing switch 21 is disposed in the withdrawn position, it, for example, interrupts the light path of a transparent optical sensor (not shown in the figures), and thus can detect when the leading edge of an original document D arrives. In addition, the timing switch 21 can detect when the trailing edge of an original document D has passed over it by returning to the operational position and thereby allowing the light path to reconnect. The detection of the leading edge or trailing edge of an original document D with the timing switch 21 can be used as a reference for the operational timing of other rollers and timing members (described below).

The post-reading roller 14 has the same structure as the pre-reading roller, and comes into contact with the front surface of the transport drum 12 to form a second nip N2 in between it and the transport drum 12. The post-reading roller 14 is driven and rotated in the clockwise direction by the counterclockwise rotation of the transport drum 12, and thus an original document D is interposed between it and the transport drum 12 and is transported thereby.

A slit glass 22 forms the original document reading position R, and is disposed below the transport drum 12. In addition, an original document guide 23 is disposed above the slit glass 22. The original document guide 23 serves to narrow the space in the radial direction of the original document D transport path formed around the periphery of the transport drum 12 near the original document reading position R, and is disposed opposite the slit glass 22 across an extremely small gap.

A switching member 24 is disposed downstream from the post-reading roller 14. The switching member 24 is supported by a support shaft 24a on the trailing end thereof which allows it to pivot thereabout. The switching member 24 is connected to a reverse/branching solenoid 25 which, when activated, will move the switching member 24 to a reverse position illustrated by the dotted lines in FIG. 1 and, when deactivated, will move the switching member 24 to a discharge position illustrated by the solid lines in FIG. 1. Original documents D that have already been read are guided to the discharge device 4 by moving the switching member 24 to the discharge position, or are guided to the reversing device 6 by moving the switching member 24 to the reverse position.

The reversing device 6 is disposed behind the switching member 24 (the right side of FIG. 1), and the discharge device 4 is disposed further to the right (in FIG. 1) of the reversing device 6. The reversing device 6 has an upper reverse roller 26 and a lower reverse roller 27 that contact each other in the approximately vertical direction, grasp an original document D therebetween, and form a reverse nip N3. The upper reverse roller 26 is connected to the transport motor 20 via the transport clutch 18. The upper reverse roller 26 rotates in the clockwise and counterclockwise direction in accordance with the clockwise and counterclockwise rotation of the transport motor 20. On the other hand, the lower reverse roller 27 is a driven roller, and is capable of moving in the vertical direction such that it comes into contact with or moves away from the upper reverse roller 26. When a reverse/pressure solenoid 28 is activated and pulls inward, the lower reverse roller 27 moves to a separated position in which the reverse nip N3 is open, illustrated by the dotted lines in FIG. 1, and when the reverse/pressure solenoid 28 is deactivated and returns to its former position, the lower reverse roller 27 moves to a contact position which forms the reverse nip N3, illustrated by the solid lines in FIG. 1.

The discharge device 4 has an upper discharge roller 30 and a lower discharge roller 31 that contact each other in the approximately vertical direction, grasp an original document D therebetween, and form a discharge nip N4. Like the upper reverse roller 26, the lower discharge roller is connected to the transport motor 20 via a transport clutch 18. The lower discharge roller 31 rotates in the counterclockwise and clockwise directions in accordance with the respective clockwise and counterclockwise rotation of the transport motor 20. On the other hand, the upper discharge roller 30 is a driven roller, and is driven and rotated in accordance with the drive rotation of the lower discharge roller 31.

The discharge tray 5 is disposed behind and below the discharge device 4 (the downstream side of the original document transport direction. The original documents D are sequentially discharged from the discharge device 4, and are stacked in the discharge tray 5. Note that regardless of whether the original documents D discharged to the discharge tray 5 have been read on one side only (the A side) or on both sides (the A side and B side), they are discharged with the A side facing downward.

An intermediate tray 32 that serves as an intermediate support member is provided behind the reversing device 6 (the downstream side in the original document transport direction). The intermediate tray 32 is disposed such that it extends above the discharge tray 5. An upper surface 32a of the front end thereof is at approximately the same height as the upper end of the upper discharge roller 30, and a lower surface 32b of the front end thereof is positioned slightly higher than the discharge nip N4 of the discharge device 4. This structure allows an original document D transported from the reversing device 6 when the orientation thereof is to be reversed (described below) to have the end thereof that is farthest away from the original document reading position R to be supported from below. Moreover, this structure will not obstruct an original document D from being discharged to the discharge device 4 (described below).

Here, the positional relationship between the discharge device 4 and the reversing device 6 of the present embodiment will be described in detail.

In the device 1, the reversing device 6 and the discharge device 4 are disposed such that the distance in the horizontal direction from the original document reading position R to the discharge device 4 is longer than the distance in the horizontal direction from the original document reading position R to the reversing device 6. Thus, it is possible to shorten the distance from the reverse nip N3 to the first transport nip N1, and the distance from the reverse nip N3 to the second transport nip N2 (the distance in which the original documents are transported). In other words, when the orientation of an original document D is to be reversed, it must be grasped by at least one of the reverse nip N3 and the first transport nip N1, or at least one of the reverse nip N3 and the second transport nip N2. However, an original document D whose length in the transport direction is short can be used because these distances are shortened in the present invention. In addition, by shortening these distances, the distance in which an original document D is transported can also be shortened, and in particular, the distance in which an original document D is transported when it is reversed and its orientation is changed can also be shortened. Note there will be a large cumulative reduction in time when a large number of original documents are processed. On the other hand, the discharge device 4 and the discharge tray 5 can be disposed to the rear of the reversing device 6 (the right side in FIG. 1) because the distance from the discharge nip N4 formed between the upper discharge roller 30 and the lower discharge roller 31 to the second transport nip N2 can be lengthened. Thus, the visibility of original documents D discharged from the discharge device 4 can be improved.

In addition, an original document D is smoothly reversed, and its orientation is smoothly switched, because the height of the reverse nip N3 is higher than that of the transport nip N4, and moreover, because the height of the upper surface of the rear end portion of the switching member 24, the height of the reverse nip N3, the height of the upper end of the upper discharge roller 30, and the height of the upper surface 32a of the front end of the Intermediate tray 32, are formed to be approximately the same.

Furthermore, an original document D can be smoothly discharged because the height of the lower surface of the rear end portion of the switching member 24 when the switching member 24 is in the discharge position, the height of the lower end of the lower discharge roller 27 when in contact with the upper discharge roller 26, and the height of the discharge nip N4, are formed to be approximately the same.

Note that in the present embodiment, the distance from the second transport nip N2 to the discharge nip N4 is the same as the distance from the reverse nip N3 and the first transport nip N1, and the discharge nip N4 is positioned further to the rear, because the length of an original document D in the transport direction that can be employed is at least longer than the distance from the reverse nip N3 to the first transport nip N1. However, in this situation, the discharge device 4 is disposed adjacent to the immediate rear of the reversing device 6, which eliminates the need to enlarge the diameter of the gear that transmits driving force from the reverse roller 26 to the lower discharge roller 31, and also eliminates the need to enlarge the number of gears provided.

Note that an automatic document feeder 1 having this type of structure can be controlled by a controller (not shown in the figures).

Figure 2:
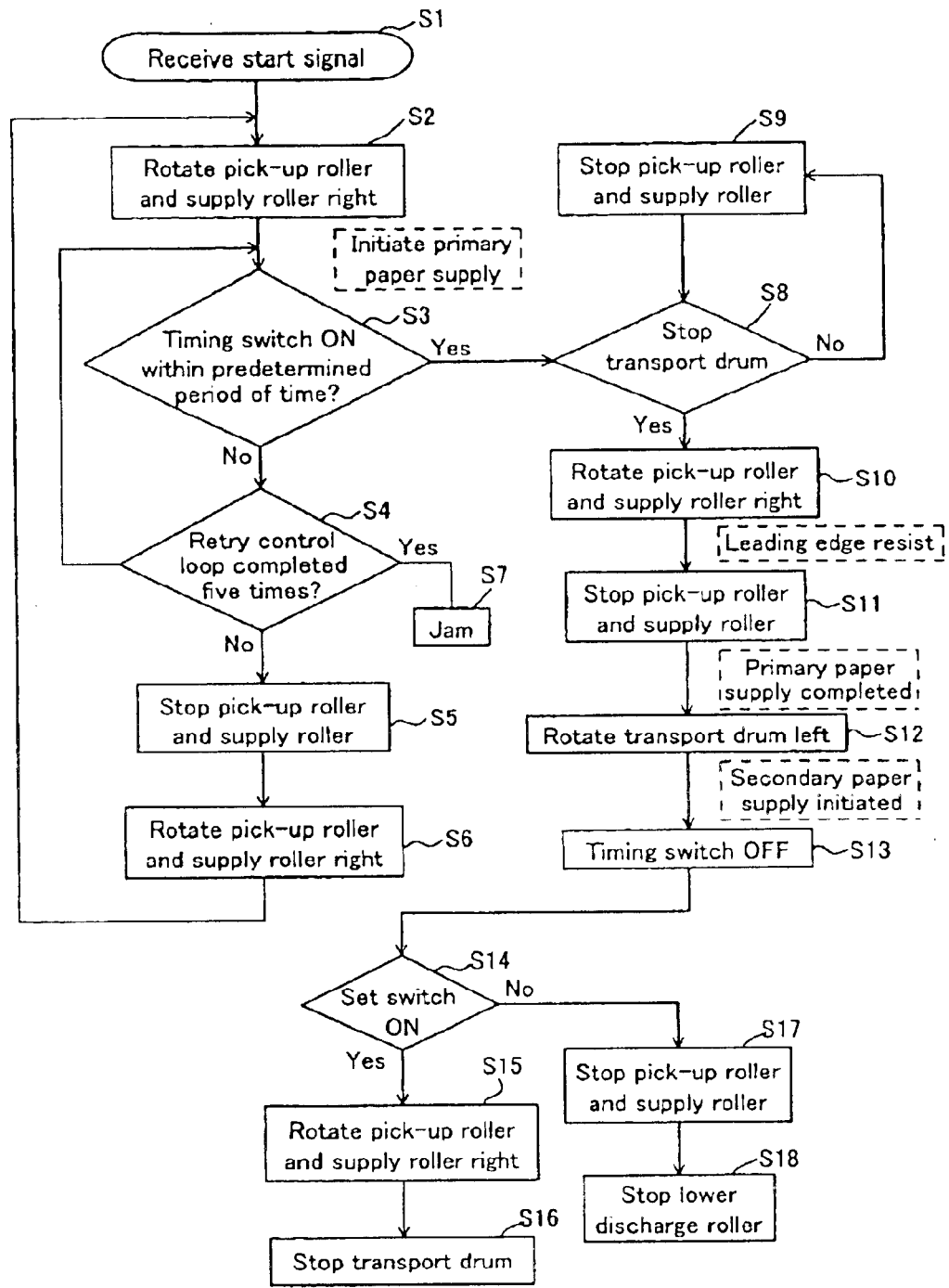
FIG. 2 is a flow chart showing the operational flow when one side of an original document is read.

Next, the operation of the automatic document feeder 1 of the present embodiment will be described with reference to the flow charts shown in FIGS. 2 to 4.

First, the reading of one side of an original document D (the A side) will be described with reference to FIG. 2. Note that in the automatic document feeder 1, when one side only (the A side) of a plurality of original documents D are read, a fixed gap is continuously maintained between a lead original document D and each subsequent original documents in order to improve efficiency.

In addition, the path from the supply roller 11 to the first transport nip N1 will be referred to as supply path P1, the path from the first transport nip N1 to the second transport nip N2 will be referred to as the read path P2, the path from the second transport nip N2 to the discharge nip N4 will be referred to as the discharge path P3, the path from the second transport nip N2 to the reverse nip N3 will be referred to as the pre-reverse path P4, and the path from the reverse nip N3 to the first transport nip N1 will be referred to as the post-reverse path P5.

Furthermore, descriptions of the operation of the supply motor 16, the supply clutch 15, the transport motor 20, and the supply clutch 18 have been omitted as needed for the sake of convenience, and instead the operation of each roller rotatively driven by these motors is described. Moreover, the control of the automatic document feeder 1 is carried out by counting the number of pulses when the timing switch 21 is turned on and when it is turned off, and when the supply motor 16 and the transport motor 20 begin rotating and stop rotating. However, as described below, the details of this are omitted.

A summary of the flow of an original document D when one side thereof (the A side) is read is as follows. A original document D placed on the loading tray 2 is supplied to the supply path P1 by the supply roller 11, is read at the original document reading position R while being transported in the read path P2 by the transport drum 12, and is then transported in the discharge path P3 and discharged to the discharge tray 5 by the discharge device 4. The reading of a one-sided original document will be described in detail below.

When an original document D is mounted on the loading tray 2 with its A side facing upward, it moves the set switch 8, the leading edge Bb is withdrawn upward, and the document feeding device 1 is thereby turned on.

On the other hand, the reverse/branching solenoid 25 is turned off, and the switching member 24 is disposed in the discharge position illustrated by the solid line in FIG. 1.

In addition, the reverse/pressure solenoid 28 is turned on (the position in which it applies pressure), the lower reverse roller 27 is disposed in a contact position illustrated by the solid line in FIG. 1 to form the reverse nip N3 between it and the upper reverse roller 26.

When the automatic document feeder 1 receives a start signal (Step S1, each step hereinafter referred to as S1, S2, S3, etc), the supply motor 16 rotates counterclockwise (hereinafter referred to as rotates left), and the pick-up roller 10 and the supply roller 11 begin rotating in the clockwise direction (hereinafter referred to as rotate right)(S2). At this time, the pick-up roller 10 drops down from the home position to the paper supply position, comes into contact with the uppermost original document D on the loading tray 2, and the pick-up roller 10 and the supply roller 11 rotate right. Paper supply (primary paper supply) begins toward the paper supply path P1.

After the rotation of the supply motor 16 begins, if the timing switch 21 is not turned on (withdrawn to the position illustrated by the dotted lines) within a predetermined period of time (S3 is no), then the flow enters into a retry control loop (S4). This retry control temporarily stops the supply motor 16, the pick-up roller 10, and the supply roller 11 (5S), then restarts the supply motor 16 and again rotates the pick-up roller 10 and the supply roller 11 (S6), and then determines whether or not the timing switch 21 has been turned on within a predetermined time period (S3). In the automatic document feeder 1, the ability of the pick-up roller 10 and the supply roller 11 to transport original documents D can be improved, and insignificant problems with the transport of original documents D can be eliminated, because this type of retry control is carried out. This retry control is carried out five times, and if the timing switch 21 is not turned on after 5 cycles have been completed (S3 is no, S4 is yes), then it is determined that a paper jam has occurred (S7).

On the other hand, if the timing switch 21 is turned on within the predetermined time period before the five cycles of the retry control are completed (S3 is yes), then when the transport motor 20 is not off, i.e., when the transport drum 12 rotates left due to the left rotation of the transport motor 20 and an original document D is read (S8 is no), the supply motor 16, the pick-up roller 10, and the supply roller 11 are stopped (S9), and the transport motor 20 and the transport drum 12 are stopped. Note that the transport motor 20 is stopped at the point when the trailing edge of an original document D passes over the original document reading position R.

If the transport drum 12 has stopped (S8 is yes), then the supply motor 16 rotates left, and the pick-up roller 10 and the supply roller 11 rotate right (S10). Thus, because the trailing edge of an original document D Is transported while the leading edge thereof is held stationary by the first transport nip N1, the original document D is flexed and a leading edge resist can be performed. After the leading edge resist is completed, the supply motor 16, the pick-up roller 10, and the supply roller 11 are stopped (S11). Thus, the primary paper supply that transports an original document D up to the first transport nip N1 is completed.

Next, secondary paper supply will be initiated. Here, the transport motor 20 is rotated in the counterclockwise direction, and the transport drum 12 is rotated left (S12). Thus, an original document D is supplied to the read path P2 while in the grasp of the first transport nip N1, transported to the original document reading position R, and the A side thereof is read.

When reading is executed, the trailing edge of the original document D passes over the timing switch 21 and thus the timing switch 21 is returned to the off position (S13).

At this time, if the set switch 8 is in the on position (S14 is yes), then another original document D is in the loading tray 2, and the transport thereof is initiated. At the point in which the reading of the previous original document D is completed, the supply motor 16 rotates left, and the pick-up roller 10 and the supply roller 11 rotate right (S15). In addition, at the point in which the trailing edge of the previous original document D passes over the original document reading position R, the transport motor 20 and the transport drum 12 stop (S16). After this, the process returns to Step S2, and initiates primary paper supply for the next original document D.

On the other hand, in Step S14, if the set switch 8 is in the off position (S14 is no), then the supply motor 16, the pick-up roller 10 and the supply roller 11 stop rotating (S17) because the original document D presently being transported is the last document. At this time, the pick-up roller 10 returns to the home position shown in FIG. 1 by means of the biasing force of a coil spring in a spring clutch (not shown in the figures). Then, at the point that the trailing edge of the original document D being transported passes over the discharge nip N3, the transport motor 20 and the lower discharge roller 31 are stopped (S18). Thus, the reading of one side (the A side) of an original document D is completed.

In this type of original document reading operation, the transport drum 12 rotates left, and an original document D is grasped and transported by the first and second transport nips N1, N2. At this time, when the rotational speed of the supply roller 11 is slower than the rotational speed of the transport drum 12, the portion of an original document D positioned in the supply path P1 while being read is pulled between the pre-reading roller 13 and the supply roller 11. Therefore, a shock is generated when the trailing edge of an original document D leaves the supply roller 11, and a load fluctuation is generated in the transport drum 12. Thus, there is a concern that the transport speed of an original document D will subtly change and cause problems in the reading of the original document D.

In order to stop this type of problem from occurring in the reading of the original document D, in the present invention, the rotational speed of the supply roller 11 is increased immediately before the trailing edge of an original document D that is being read passes over the supply roller 11. The rotational speed of the supply roller 11 at this time is set such that, for example, the speed at which the trailing portion of an original document D is transported by the supply roller 11 is 1.5 times faster than the speed at which the original document D is transported by the transport drum 12. Thus, the trailing portion of an original document D will come loose, and the generation of the aforementioned shock can be suppressed.

Next, a situation will be described in which both sides (the A side and the B side) of an original document D are read, with reference to the flowcharts in FIGS. 3 and 4.

A summary of the flow of an original document D when both sides thereof (the A side and the B side) are read is as follows. An original document D placed in the loading tray 2 is supplied to the supply path P1 by the supply roller 11, and the A side thereof is read at the original document reading position R while being transported in the read path P2 by the transport drum 12. After this, the orientation the original document D is reversed by means of the pre-reverse path P4 and the post-reverse path P5. Then, the original document D is transported from the post-reverse path P5 to the read path P2, the B side thereof is read at the original document reading position R, and the orientation of the original document D is again reversed by the pre-reverse path P4 and the post-reverse path P5. Then, after the original document D is transported from the post-reverse path P5 to the read path P2, and is transported to the original document reading position R in the read path P2 without being read, it is transported to the discharge path P3 and discharged to the discharge tray by the discharge device 4.

A detailed description of dual side reading of an original document D will now be provided below. Note that Steps S1 to S11 shown in FIG. 3 are identical to the one-sided reading described in FIG. 2, and thus a description thereof will be omitted.

Figure 3:
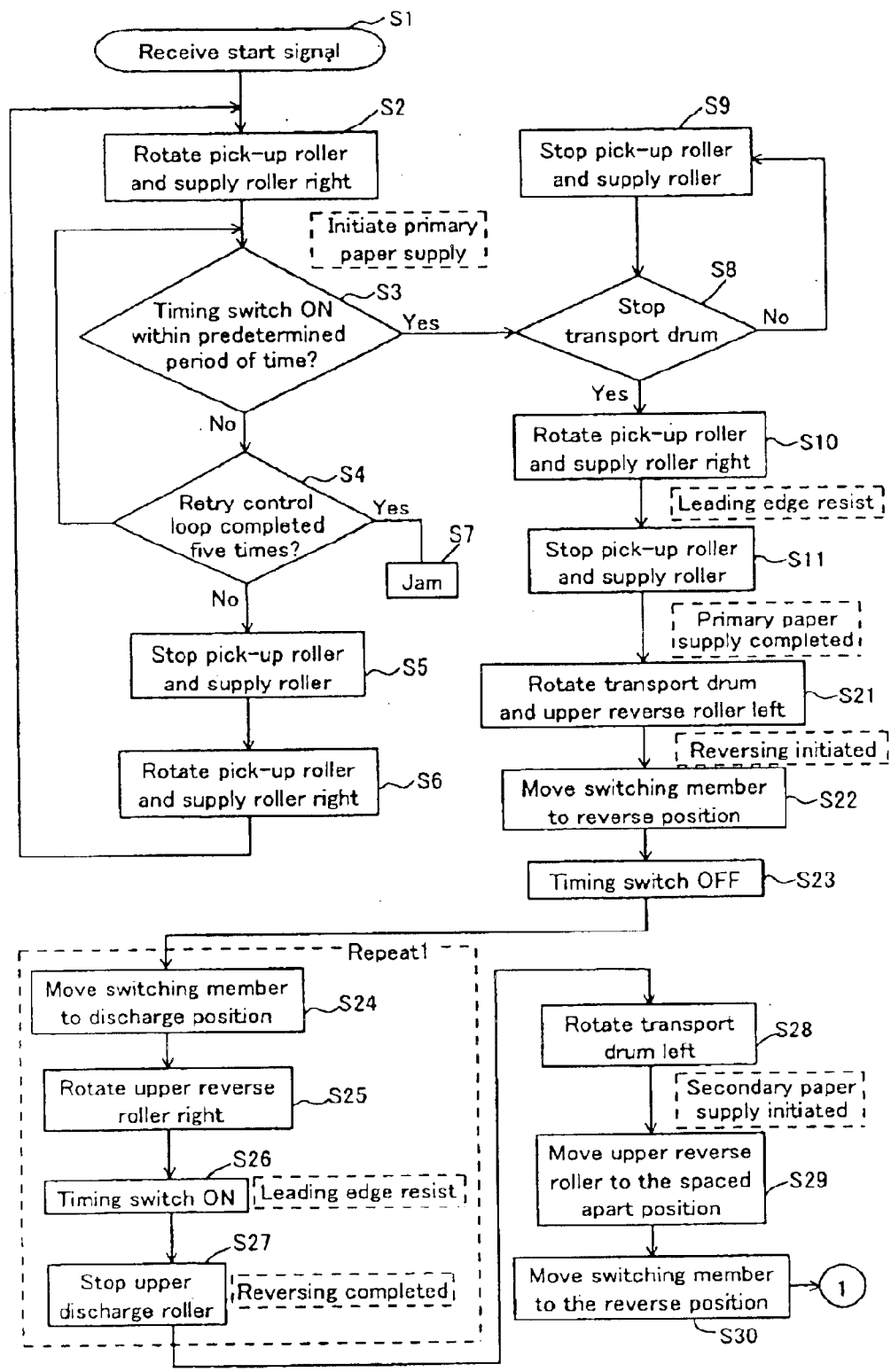
FIG. 3 is a flow chart showing the operational flow when both sides of an original document are read.
Figure 4:
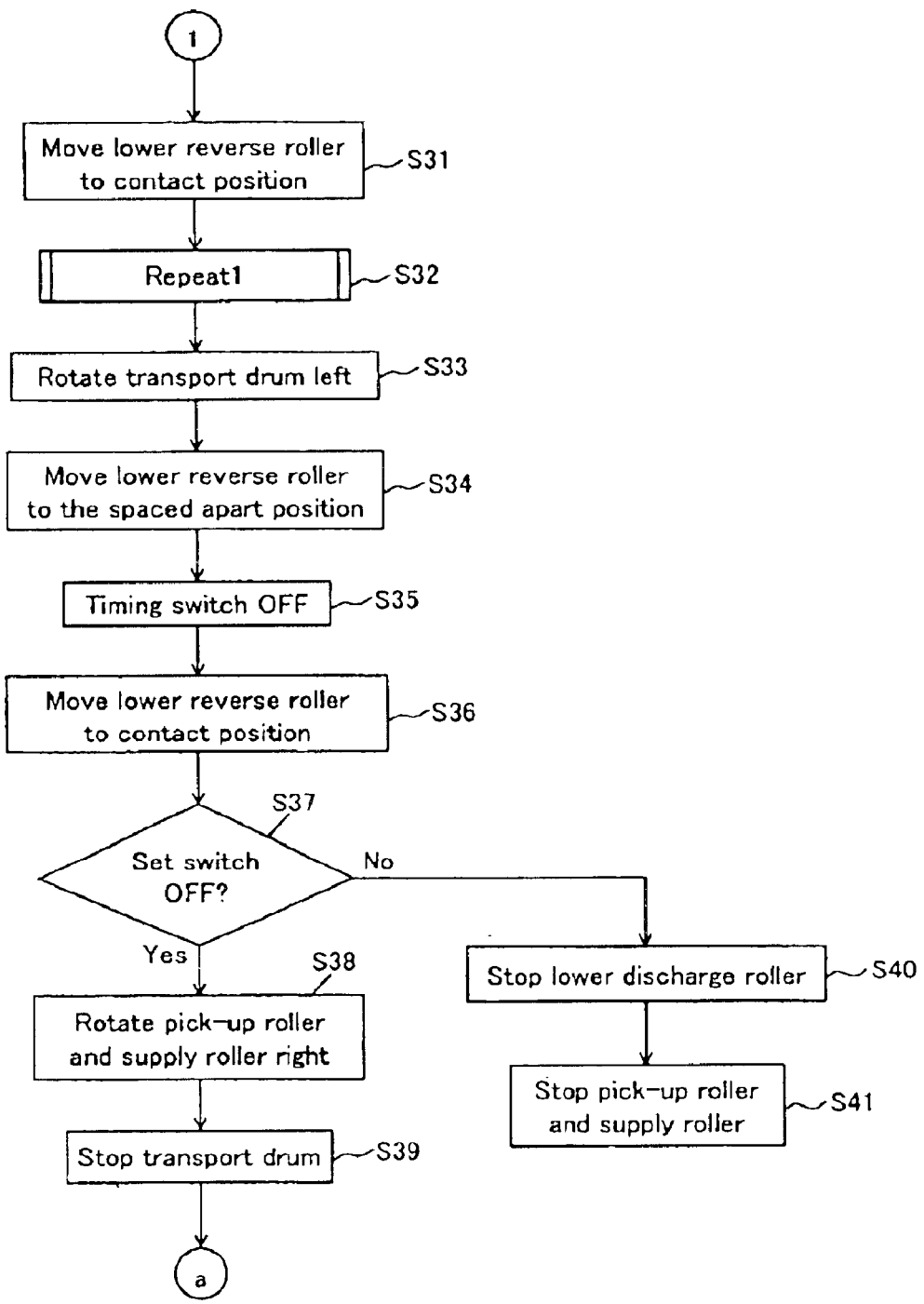
FIG. 4 is a flow chart showing the operational flow when both sides of an original document are read.

As shown in FIG. 3, if both sides of an original document D are read, the reversal of the original document D will be initiated after the primary paper supply is completed at Step S11.

When the primary paper supply is completed, the transport motor 20 rotates left, and the transport drum 12 and the upper reverse roller 26 rotate left (S21). Before the leading edge of an original document D reaches the switching member 24, the reverse/branching solenoid 25 is tuned on, and the switching member 24 is placed in the reverse position (S22). Thus, the discharge path P3 is closed, and the reverse path P4 is opened. Then, the original document D is guided to the switching member 24 and is transported inside the pre-reverse path P4 toward the reversing device 6. Furthermore, the original document D is grasped and transported by the reverse nip N3 by means of the left rotation of the upper reverse roller 26, and the leading edge of the original document D continues rearward along the upper surface of the intermediate tray 32. Then, when the trailing edge of the original document D passes over the timing switch 21 and the timing switch 21 is turned off (S23), the reverse/branching solenoid 25 is turned off and the switching member 24 is placed in the discharge position (S24) at the point at which the trailing edge of the original document D reaches the rear end of the switching member 24. Thus, the pre-reverse path P4 is closed and the post-reverse path P5 is opened. In addition, at approximately the same time, the transport motor 20 rotates right, thereby rotating the upper reverse roller 26 to the right Thus, the trailing edge of the original document D now becomes the leading edge thereof, the original document D is moved in the approximately forward direction inside the reverse path P5, and is transported toward the pre-reading roller 13. Note that at this time the transport drum 12 is stopped by operation of the aforementioned one-way clutch. The, after the timing switch 21 is turned on by the leading edge of the original document D (S26), the leading edge of the original document D comes into contact with the first transport nip N1, and the leading edge resist of the original document D occurs After this, the upper reverse roller 26 stops (S27) by stopping the transport motor 20, ad thus the reverse operation of the original document D is completed.

After the reverse operation is completed, the secondary paper supply is initiated, and by rotating the transport motor 20 to the left, the transport drum 12 and the upper reverse roller 26 rotate to the left (S28). Then, at approximately the same time that the secondary paper supply is initiated, the reverse/pressure solenoid 28 is retracted to the on state, the upper reverse roller 27 is placed in the spaced apart position, and the reverse nip N3 is released (s29). Thus, the original document D is transported inside the read path P2, and the B side thereof is read at the original document reading position R. Next, before the leading edge of the original document D reaches the switching member 24, the reverse/branching solenoid 25 is turned on, and the switching member 24 is placed in the reverse position (S30).

After the timing switch 21 is turned off by the trailing edge of the original document D, the reverse/pressure solenoid 28 is turned on and returns to its original position, the lower reverse roller 27 is placed in the contact position, and the reverse nip N3 is formed thereby (S31). Thus, the original document D is grasped with its A side facing upward and transported to the intermediate tray 32 by the reverse nip N3, and the trailing edge of the original document D will continue to be in the grasp of the reverse nip N3.

After that, Repeat1 in FIG. 3 is repeated. Thus, in the re-reversed state, the original document D is stopped with its leading edge in contact with the first transport nip N1 (e.g., the state when the original document D is first supplied to the supply path P1 by the supply roller 11).

After this, when the transport motor 20 and the transport drum 12 turn left (S33), the original document D is grasped and transported by the first transport nip N1. When this occurs, the reverse/pressure solenoid 28 is turned on to the retracted position, the lower reverse roller 27 is placed in the spaced apart position (S34), and the reverse nip N3 is released so that the resistance of the reverse nip N3 does not act upon the original document D. After this, when the timing switch 21 is turned off by the trailing edge of the original document D (S35), the reverse/pressure solenoid 28 is turned on and returns to its original position, the lower reverse roller 27 is placed in the contact position (S36), and the reverse nip N3 is formed thereby. In this way, the discharge path P3 is opened. Note that the original document D is sent into the read path P2 by the first transport nip N1 but is not read, and the original document D is sent into the discharge path P3 by the second transport nip N2 and is then discharged to the discharge tray 5 by the discharge device 4.

Here, when the reverse/pressure solenoid 28 is turned on and returns to its original position (S36), and it is determined that the set switch is tuned on (S37 is yes), the supply of any remaining documents D in the loading tray 2 is initiated. At the point in which the reading of the previous original document D is completed, the supply motor 16 rotates left, and the pick-up roller 10 and the supply roller 11 rotate right (S38). Furthermore, at the point in which the trailing edge of the previous original document D passes over the original document reading position R, the transport motor 20 and the transport drum 12 stop (S39). After this, the process returns to Step S2, and initiates primary paper supply for the next original document D.

On the other hand, in Step S37, when the set switch 8 is in the off position (S37 is no) because the original document D presently being transported is the last original document on the loading tray 2, the original document D is discharged by the right rotation of the lower discharge roller 31, and the transport motor 20 and the lower discharge roller 31 are stopped at the point in which the trailing edge of the original document D passes over the discharge nip N3 (S40).

After this, the supply motor 16, the pick-up roller 10, and the supply roller 11 are stopped (S41). Thus, the reading of both sides of the original document D is completed.

The automatic document feeder 1 constructed as described above can handle an original document D whose length in the direction in which it is transported is short because the reversing device 6 is disposed close to the original document reading position R, and can also shorten the amount of time needed to read an original document D because the transport path is shortened. In addition, the automatic document feeder 1 can improve the visibility of an original document D discharged to the discharge tray 5 by the discharge device 4 because the discharge device 4 is disposed some distance away from the original document reading position R.

B. Image Forming Device

Figure 5:
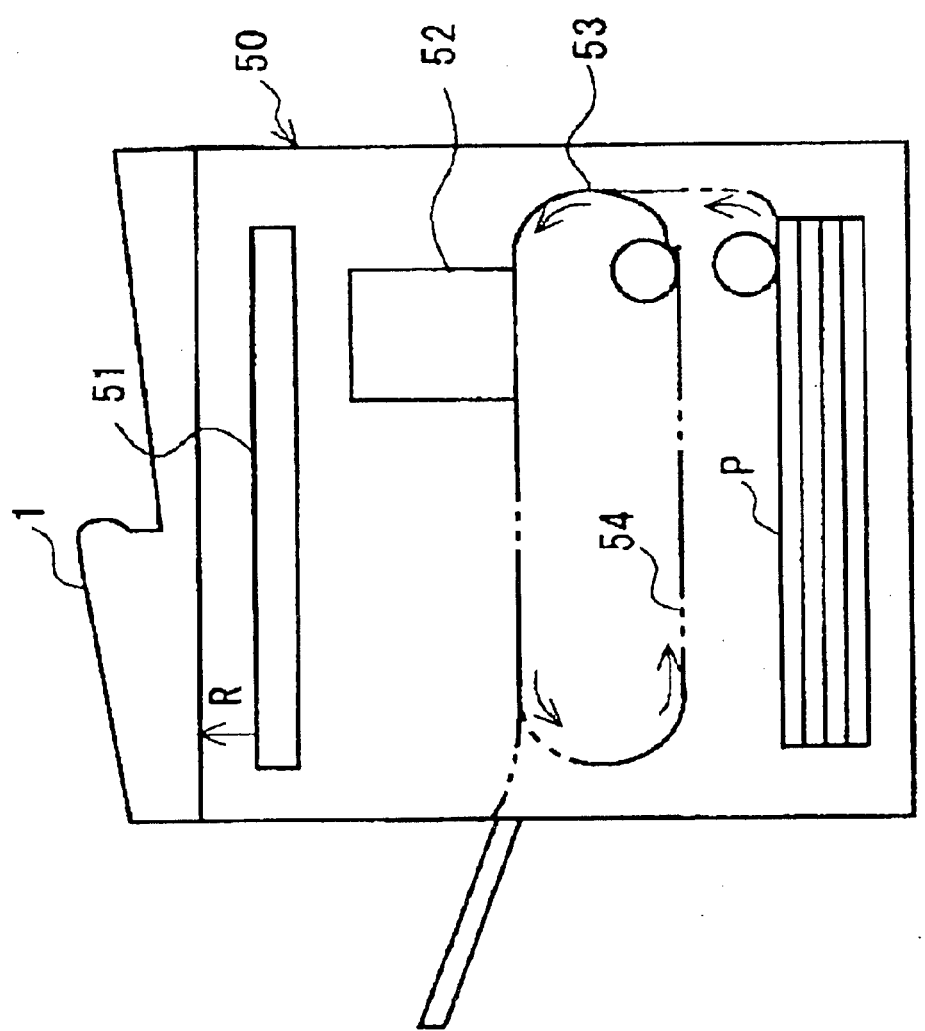
FIG. 5 is a longitudinal section which schematically illustrates an image forming device in which the automatic document feeder shown in FIG. 1 is disposed.
Figure 6:
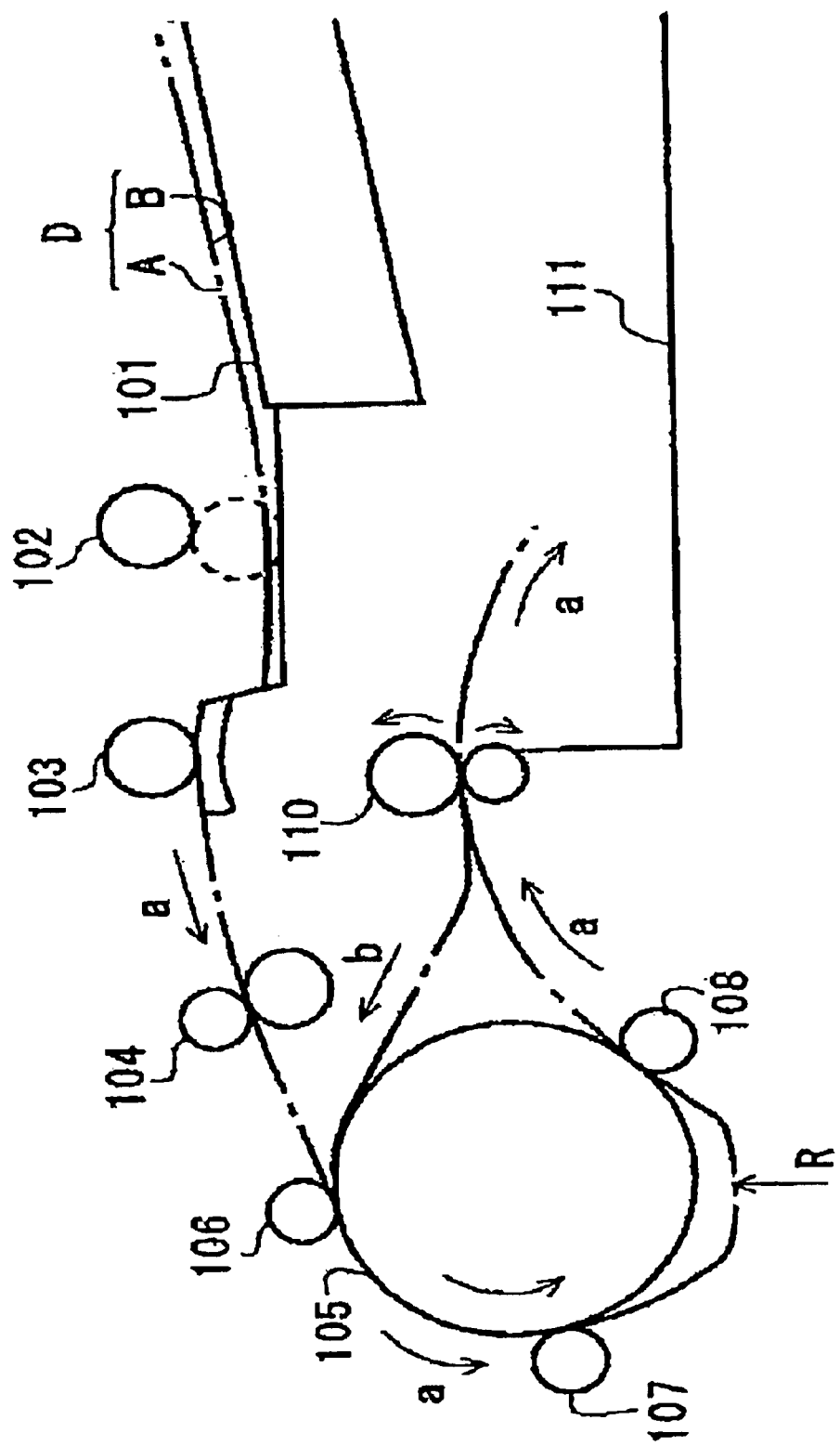
FIG. 6 is a schematic illustration of a prior art automatic document feeder.
Figure 7:
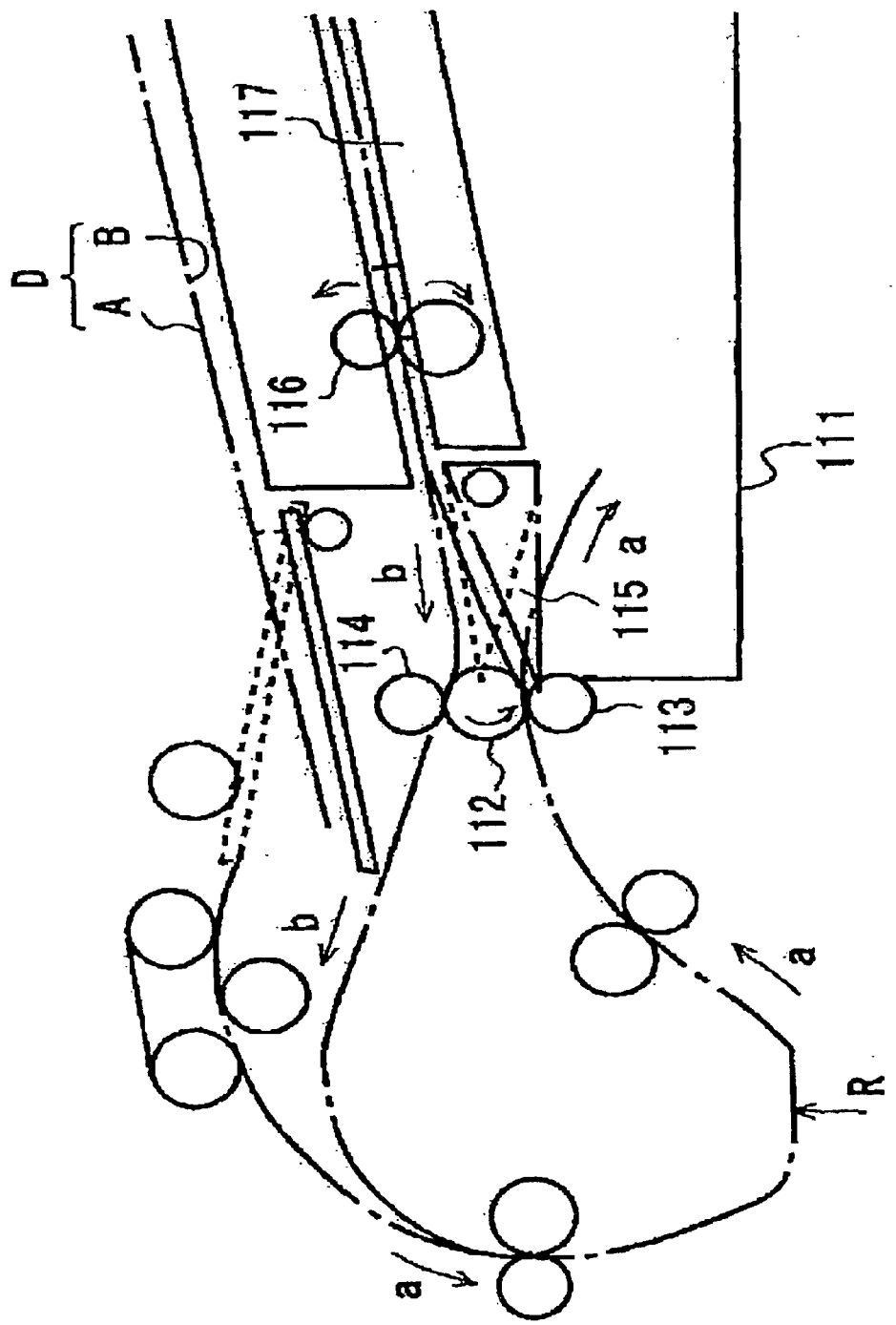
FIG. 7 is a schematic illustration of another prior art automatic document feeder.

FIG. 5 shows a schematic view of an image forming device 50 according to one embodiment of the present invention, and which comprises an automatic document feeder.

The image forming device 50 comprises an original document reading device 51, an automatic document feeder 1, an image forming unit 52, a recording medium supply and transport device 53, and a recording medium reversing device 54.

The automatic document feeder 1 according to the aforementioned embodiment can be used as the automatic document feeder 1 in this image forming device. An optical original document reading device known in the prior art can be used as the original document reading device 51. The original document reading device 51 is a device for sequentially reading original documents supplied to the original document reading position R by the automatic document feeder 1. The image forming unit 52 forms a toner image on a recording medium P such as paper or the like, based on image data read by the original document reading device 51. The recording medium supply/transport device 53 is a device for supplying recording media P to the image forming unit 52, and transporting the recording media P out of the image forming unit 52 after image formation is completed. The recording medium reversing device 54 is a device for reversing the front and back of a recording medium P on one side of which an image has been formed, and re-supplying that recording medium P to the image forming unit 52. By equipping the image forming device 50 with the recording medium reversing device 54, the images on both sides of an original document can be automatically formed as is onto both sides of a recording medium P.

An ink jet system may, for example, be employed as the image forming unit 52.

In an image forming device 50 constructed in this manner, image formation can take place based on an original document D whose length in the transport direction is short, and the overall amount of time needed for image formation, including the time needed for reading the images, can be shortened. In addition, in the image forming device 50, both an original document D and a copy thereof can be easily checked by the operator thereof due to the fact that both are readily visible inside the device.

Terms of degree used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. An automatic document feeder, comprising:
    a loading unit into which an original document is loaded;
    a supply device that supplies original documents loaded in the loading unit to an original document reading position;
    a discharge device that discharges original documents read at the original document reading position;
    a discharge unit that supports original documents discharged by the discharge device; and
    a reversing device disposed below the loading unit and above the discharge device, and which reverses the orientation of the original document read at the original document reading position and re-supplies the original document back to the original document reading position;
    wherein the reversing device and the discharge device are disposed such that a distance in a horizontal direction from the original document reading position to the discharge device is longer than a distance in a horizontal direction from the original document reading position to the reversing device.

2. The automatic document feeder set forth in claim 1, wherein the reversing device comprises an upper reverse roller and a lower reverse roller disposed in a substantially vertical direction, which form a reverse nip that grasps and transports the original document by mutually contacting the original document.

3. The automatic document feeder set forth in claim 2, wherein the discharge device comprises an upper discharge roller and a lower discharge roller disposed in a substantially vertical direction, which form a discharge nip that grasps and transports the original document by mutually contacting the original document.

4. The automatic document feeder set forth in claim 3, wherein the reverse nip is disposed above the discharge nip.

5. The automatic document feeder set forth in claim 4, further comprising a switching member that is selectively placed in a reverse position in order to guide an original document read at the original document reading position to the reverse nip, and a discharge position in order to guide an original document read at the original document reading position to the discharge nip.

6. The automatic document feeder set forth in claim 5, further comprising an intermediate support member that supports a first end of an original document while a second end of the original document is in the grasp of the reverse nip.

7. An image forming device, comprising:
    an original document reading device that reads an original document and is disposed in an original document reading position;
    the automatic document feeder set forth in claim 1;
    an image forming unit that forms images on recording media based upon image data read by the original document reading device; and
    a recording media supply/transport device that supplies recording media to the image forming unit, and transports the recording media on which images have been formed away from the image forming unit.

* * * * *